United States Patent
Steinmetz et al.

(10) Patent No.: US 10,239,743 B2
(45) Date of Patent: Mar. 26, 2019

(54) FITTING FOR A CASK HAVING AN OVERPRESSURE FUNCTION

(71) Applicant: DSI GETRAENKEARMATUREN GMBH, Hamm (DE)

(72) Inventors: Harald Steinmetz, Aachen (DE); Philipp Sommer, Lippstadt (DE); Mirco Wolter, Welver (DE)

(73) Assignee: DSI GETRAENKEARMATUREN GMBH, Hamm (DE)

( * ) Notice: Subject to any disclaimer, the term of this patent is extended or adjusted under 35 U.S.C. 154(b) by 0 days.

(21) Appl. No.: 15/752,208

(22) PCT Filed: Jul. 22, 2016

(86) PCT No.: PCT/DE2016/100330
§ 371 (c)(1),
(2) Date: Feb. 12, 2018

(87) PCT Pub. No.: WO2017/025080
PCT Pub. Date: Feb. 16, 2017

(65) Prior Publication Data
US 2018/0362323 A1      Dec. 20, 2018

(30) Foreign Application Priority Data
Aug. 13, 2015   (DE) .................. 10 2015 113 387

(51) Int. Cl.
*B67D 1/12* (2006.01)
*B67D 1/08* (2006.01)
(Continued)

(52) U.S. Cl.
CPC ........... *B67D 1/125* (2013.01); *B67D 1/0832* (2013.01); *F16K 17/02* (2013.01); *F16K 17/19* (2013.01)

(58) Field of Classification Search
CPC .... B67D 1/125; B67D 1/0832; B67D 1/0838; B67D 2001/0822; F16K 17/02;
(Continued)

(56) References Cited

U.S. PATENT DOCUMENTS 4,488,572 A * 12/1984 Brown ................. B67D 1/0832
                                                    137/15.09
4,509,663 A    4/1985 Fallon
(Continued)

FOREIGN PATENT DOCUMENTS

CN        101282901       10/2008
DE      19958958 A1        6/2000
(Continued)

OTHER PUBLICATIONS

German Office Action for Application No. 10 2015 113 387.3 dated May 12, 2017; 12 pp.
(Continued)

*Primary Examiner* — Ian Paquette
(74) *Attorney, Agent, or Firm* — Hauptman Ham, LLP (57) ABSTRACT

A fitting arrangement for a cask is disclosed having a fitting sleeve with a riser pipe arranged therein, and resiliently moveable relative thereto. The fitting sleeve has a conically extending inner sealing surface tapering toward an upper end, and a seal is incorporated between the inner sealing surface and the upper end of the riser conduit. The riser pipe is pressed with the seal against the sealing surface with a spring force, and the seal is arranged internally in the upper end of the riser pipe, wherein a sealing body is arranged in the upper end of the riser pipe and is resiliently moveable relative thereto, which sealing body comes to bear with form-fit engagement on an internal sealing surface of the seal as a result of the spring force.

11 Claims, 5 Drawing Sheets

(51) Int. Cl.
    *F16K 17/02*    (2006.01)
    *F16K 17/19*    (2006.01)
(58) Field of Classification Search
    CPC .. F16K 17/04; F16K 17/0406; F16K 17/0426;
        F16K 17/044; F16K 17/048; F16K 17/06;
        F16K 17/065; F16K 17/08; F16K 17/082;
        F16K 17/10; F16K 17/18; F16K 17/19;
        F16K 17/196
    USPC .............................. 137/212, 322; 222/400.7
    See application file for complete search history.

(56) References Cited

U.S. PATENT DOCUMENTS

| 4,603,838 | A | * | 8/1986 | Gotch | .................. | B67D 1/0832 |
|---|---|---|---|---|---|---|
| | | | | | | 137/322 |
| 5,595,208 | A | * | 1/1997 | Augustinus | .......... | B67D 1/0832 |
| | | | | | | 137/212 |
| 2009/0134177 | A1 | | 5/2009 | Furuichi et al. | | |
| 2010/0308544 | A1 | | 12/2010 | Riis | | |
| 2012/0301765 | A1 | | 11/2012 | Loo et al. | | |

FOREIGN PATENT DOCUMENTS

| DE | 102005010161 A1 | 5/2006 |
|---|---|---|
| DE | 102006014983 A1 | 12/2007 |
| DE | 102013003433 A1 | 8/2014 |
| EP | 1921039 A1 | 5/2008 |
| EP | 2528134 A1 | 11/2012 |
| EP | 2741343 A1 | 6/2014 |
| WO | 9100240 A1 | 1/1991 |
| WO | 9914156 A1 | 3/1999 |
| WO | 2008138335 A2 | 11/2008 |

OTHER PUBLICATIONS

International Preliminary Report on Patentability for PCT/DE2016/100330 dated Nov. 10, 2017; 11pp.
International Search Report for Application No. PCT/DE2016/100330, dated Oct. 26, 2016, 6 pp.
Office Action in CN Application No. 201680054303.9, dated Aug. 17, 2018, 7pp.

* cited by examiner

FITTING FOR A CASK HAVING AN OVERPRESSURE FUNCTION

RELATED APPLICATIONS

The present application is a National Phase of International Application Number PCT/DE2016/100330 filed Jul. 22, 2016 and is related to and claims priority benefits from German Application No. 10 2015 113 387.3 filed on Aug. 13, 2015.

BACKGROUND

1. Field of the Invention

The disclosure is generally related to a fitting arrangement, and more specifically, to a fitting arrangement for a cask.

2. Description of the Related Art

It is known from the prior art that beverages for consumption can be stored in containers. This permits transport from the site of production of the beverage, for example a brewery, to the place of consumption.

Conventional containers for beverages are bottles and casks. In the latter case, it is possible for larger amounts of the respective beverage, for example more than 10 liters, in particular more than 20 liters and preferably more than 30 liters of beverage, to be made available in one cask.

In order now to extract the beverage from the cask, it is possible to tap the latter at a lower region of the cask such that the beverage can be withdrawn from the cask in particular by gravity.

However, it is also known from the prior art to tap the beverage under pressure from the cask with the aid of a gas in particular. $CO_2$ is used in particular for this purpose. Nowadays, the casks therefore have a cask body itself, i.e. the outer shell, wherein a fitting is arranged in most cases centrally on an upper side of the cask, which fitting permits connection to a tap installation for introducing gas and for withdrawing the beverage. For this purpose, tap heads are coupled, with form-fit engagement and in a fluid-tight manner, to the tap head connector of the cask fitting.

During the storage and/or transportation of the cask, the scenario described below can arise. The cask is filled with the respective beverage in the filling plant. The cask should be almost completely filled in the filling plant. This filling operation takes place at temperatures of just over 0° C., especially at a beverage temperature of about 2° C. to 3° C. When such a cask is transported, temperatures of more than 50, 60 or even 70° C. can arise in the cask, for example during transportation under a truck tarpaulin. This ensures that the internal pressure in the cask rises and, in the worst case, even exceeds an admissible pressure of the cask. As as result, the cask would undergo permanent (plastic) deformation at such temperatures and would therefore be damaged or would even burst. This occurs in particular if a sufficient gas cushion serving as a buffer is no longer present after filling. To prevent this from happening, there are various overpressure functions in one fitting. For example, WO 99/14156 A discloses a cask seal in which a cutting ring is arranged in an elastic material such that, in the event of an overpressure, the entire sealing body for one part slips out of the fitting. Openings are moreover provided on the sealing body, such that an overpressure of the cask can escape to the environment.

Moreover, U.S. Pat. No. 5,595,208 B, for example, discloses a cask seal in which a punch ring is incorporated in an elastic sealing body such that, in the event of an overpressure, a part of the sealing body is punched out and exits to the environment.

SUMMARY

According to one exemplary embodiment, a cask seal is provided which has a very good trigger function in the event of an overpressure but which at the same time further increases the operational safety specifically in the region of the fitting.

The fitting arrangement for a cask has a fitting sleeve with a riser pipe which is arranged therein and resiliently movable relative thereto. The fitting sleeve has a conically extending inner sealing surface tapering toward an upper end, and a seal is incorporated between the inner sealing surface and the upper end of the riser pipe, and, on account of a spring force, the riser pipe is pressed with the seal against the sealing surface, and the seal is arranged internally in the upper end of the riser pipe. A sealing body is arranged in the upper end of the riser pipe itself and is resiliently movable relative thereto, which sealing body comes to bear with form-fit engagement on an internal sealing surface of the seal on account of a spring force. The seal itself has an inner reinforcement ring which is surrounded by an elastic sealing material. The fitting arrangement is characterized in that the reinforcement ring has a material recess on its outer jacket surface, such that the distance from the reinforcement ring to the inner sealing surface of the fitting sleeve is increased in the region of the material recess.

When the fitting arrangement is mounted on a cask, the riser pipe gives rise to a beverage side within the riser pipe itself and a gas side between riser pipe and fitting sleeve. As a result of an overpressure arising within the cask, the same pressure is present both on the beverage side and on the gas side within the cask. On account of the material recess, a larger part of the elastic sealing material is exposed to this elevated pressure. As a result, the elastic sealing material is pressed out of the cask in the direction of the environment and elastically deforms. This elastic deformation occurs until a fluid channel is opened between inner sealing surface and seal, after which the overpressure can escape to the environment. In the present invention, this takes place in particular from the gas side located between riser pipe and fitting sleeve.

Compared to sealing arrangements known from the prior art, the fitting arrangement thus has the advantages listed below. The overpressure function is reversible, which means that the seal is not destroyed as a result of an overpressure.

The escape of the overpressure from the cask takes place from the direction of the gas side. This prevents a jet of fluid from escaping as a result of the overpressure. Should this happen, for example during manual loading of the casks, there is then no danger of the person loading the casks being hit by the escaping jet of fluid. After the escape of the overpressure, the seal independently closes again at least partially. The critical overpressure is reduced, but the beverage present in the cask can in some circumstances be supplied for a further use. The seal and the entire fitting arrangement otherwise remain in their correct position of use. This means that the reinforcement ring remains covered by the sealing body, and a shooting-out of the sealing body and/or of the seal of the riser pipe is structurally prevented. The operational safety of use of a fitting arrangement according to the invention is thereby greatly increased, while at the same time the overpressure function is ensured and maintained over a long period of time.

The sealing body is preferably designed as a ball, wherein the reinforcement ring has a radially inwardly tapering internal diameter, such that the internal diameter of the reinforcement ring at an upper end is smaller than the diameter of the ball.

An inner jacket surface of the reinforcement ring is in particular formed hemispherically at least in part, but in particular formed radially all the way round. This means that the sealing body in the form of a ball is covered circumferentially on all sides. Preferably, an internal diameter of the reinforcement ring is thereby smaller than the diameter of the ball itself. This specifically prevents the ball from being pushed out or shooting out in the event of an overpressure. A reduction of the overpressure from the direction of the riser pipe, and therefore from the beverage side, is thereby avoided.

According to an exemplary embodiment, the seal, in the installation position, has an upper head portion and, extending away from this, a lower web portion. The head portion, in the installation position, tapers upward. On an outer jacket surface, the head portion thus comes to bear, with form-fit engagement and in a fluid-tight manner, on the inner sealing surface of the fitting housing. On an inner jacket surface of the seal, the sealing body comes to bear with form-fit engagement and in a fluid-tight manner, particularly in the form of a ball. The sealing body is designed in particular as an A, G, S, D, M or U system, particularly preferably as a D system.

The reinforcement ring in the seal is formed in particular from a hard, minimally elastically deformable material. For this purpose, a metallic material is used in particular, preferably of corrosion-resistant steel, in particular stainless steel.

The elastic sealing material, which encloses the reinforcement ring at least partially, in particular completely, is preferably formed from an elastically deformable plastic-like material and/or rubber-like material. An elastomeric material is particularly preferably used.

This preferably involves mixtures based on the polymers NBR, EPDM or FKM, in particular with material hardness levels of between 75 and 95 Shore A, food-compliant constituents, and resistance to commercially available cleaning and disinfecting media used in beverage casks.

In particular, the elastically deformable material is coupled to the reinforcement ring, particularly preferably by material bonding. In the manufacturing process, the elastically deformable sealing material can in particular be adhesively bonded to the reinforcement ring and/or vulcanized thereon. This is preferably done by cleaning the reinforcement ring with an adhesion-promoting primer and subsequently encapsulating it with the elastically deformable sealing material by injection molding or potting.

On the reinforcement ring itself, the material recess is formed, in a preferred embodiment variant, as a beveled surface or flat surface. In a further embodiment variant, provision is made that the recess is also formed as a groove in the outer jacket surface. As a further alternative, the recess can be formed as a notch. In particular, however, at least one partially beveled surface is formed. However, the beveled surface can itself also be curved and thus, following the profile of the outer jacket surface, can have an outwardly curved curvature or camber.

Moreover, apertures are particularly preferably formed in a jacket surface of the fitting sleeve, in particular in a jacket surface of the fitting sleeve arranged in the cask. The riser pipe is widened in diameter in the region of its upper end, wherein in particular the seal, particularly preferably with the riser section, is received with form-fit engagement and/or frictional engagement in the widened end, particularly preferably with an interference fit. The end of the riser pipe is widened or flared open like a tulip. It is also particularly preferable that an external diameter of the riser pipe, and in particular of the reinforcement ring located in the seal, is greater than an internal diameter of the inner sealing surface of the fitting sleeve. This too in turn prevents the riser pipe from springing out and/or sliding out from the fitting sleeve in the event of an overpressure.

According to another exemplary embodiment, a cask equipped with an above-described fitting arrangement is disclosed, wherein the cask is filled at least partially, preferably completely, with a beverage. In the case of complete filling, a compensating volume with compressible fluid in the form of a gas is sometimes understood as complete filling. Accordingly, the cask is characterized in that, in the event of an overpressure, a part of the elastic sealing body is deformed elastically outward in the region of the material recess, such that the overpressure escapes to the environment.

A gas side within the cask is formed in particular between riser pipe and fitting sleeve, in which gas side a safety volume of a compressible fluid, particularly a gas, is present, wherein the overpressure escapes from the cask on the gas side. The overpressure function can also be referred to as pressure relief. This triggers in particular at an internal pressure in the cask of between 30 bar and 35 bar at room temperature, consequently 20° C. and 25° C. The elastic sealing material is therefore deformed toward the outside. At elevated temperature, for example 50° C., the elastic sealing material also becomes softer, such that the pressure relief triggers at approximately 30 bar. However, the fitting arrangement can also be designed such that the pressure relief already triggers at 20 bar. Moreover, the system is preferably designed such that it closes again when a differential pressure is reached below the pressure of the triggering of the pressure relief. The differential pressure is preferably at 1 bar to 20 bar, preferably 2 bar to 15 bar, in particular 5 bar to 12 bar, and very particularly preferably 10 bar below the trigger pressure of the pressure relief. For example, the pressure relief is triggered at 32 bar and closes again at about 22 bar.

According to an exemplary embodiment, a method for operating the cask is disclosed. The method then includes the triggering of the sealing action as a consequence of overpressure. However, this is usually affected only by an external effect on the cask, in particular the effect of temperature. The advantage of this is that, when the pressure rises, the elastic sealing material deforms exclusively elastically and thus experiences no plastic or other destructive deformation. In particular, the sealing is completely reversible. Preferably, the seal can be used several times in succession following an overpressure.

BRIEF DESCRIPTION OF THE DRAWINGS

For an understanding of embodiments of the disclosure, reference is now made to the following description taken in conjunction with the accompanying drawings, in which.

In the figures, the same reference signs are used for identical or similar component parts, even if a repeated description is omitted for reasons of simplification.

DETAILED DESCRIPTION OF SOME EMBODIMENTS

Some embodiments will be now described with reference to the Figures.

Figure 1:
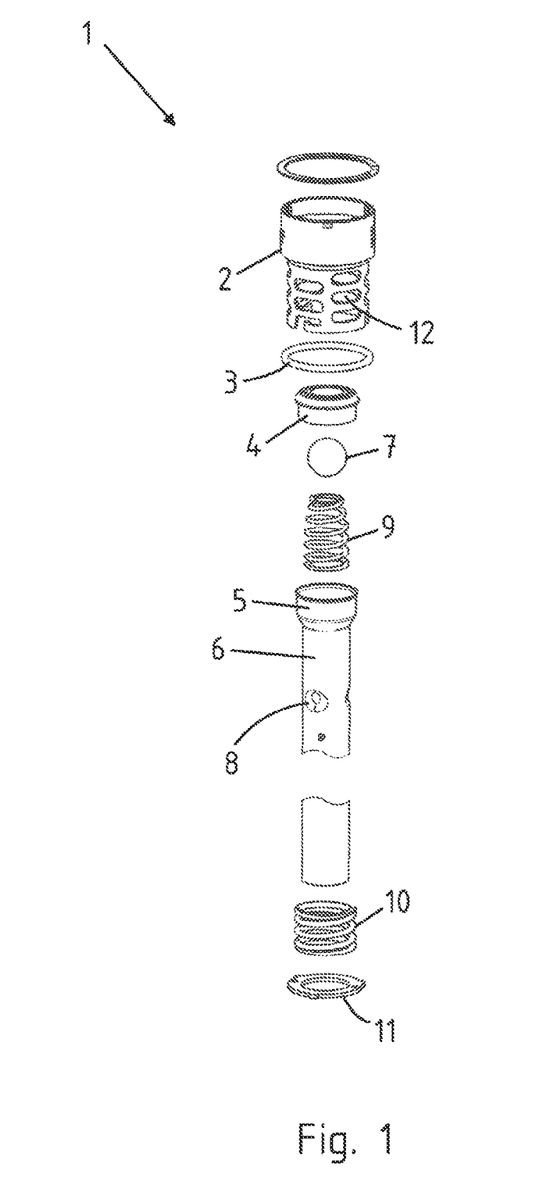
FIG. 1 shows an exploded view of a fitting arrangement in accordance with an exemplary embodiment.

In FIG. 1, the fitting arrangement 1 is shown in an exploded view. A fitting sleeve 2 has an outer sealing ring 3, to be arranged in a fluid-tight manner in a cask (not shown). Arranged in the fitting sleeve 2 is a seal 4, which is inserted with form-fit engagement and in a fluid-tight manner into an upper end 5 of a riser pipe 6. For this purpose, a sealing body in the form of a ball 7 is fitted with a helical compression spring 9, such that the ball 7 is brought into form-fit engagement with an internal sealing surface of the seal 4 counter to a spring force. For this purpose, cambers 8 are formed in the riser pipe 6 which keep the helical compression spring 9 with form-fit engagement in the riser pipe 6. Furthermore, a helical compression spring 10 surrounding the riser pipe 6 and a retaining ring 11 are arranged which press the entire riser pipe 6 from the inside into the fitting sleeve 2. Moreover, the fitting sleeve 2 has apertures 12 in its jacket surface.

Figure 2:
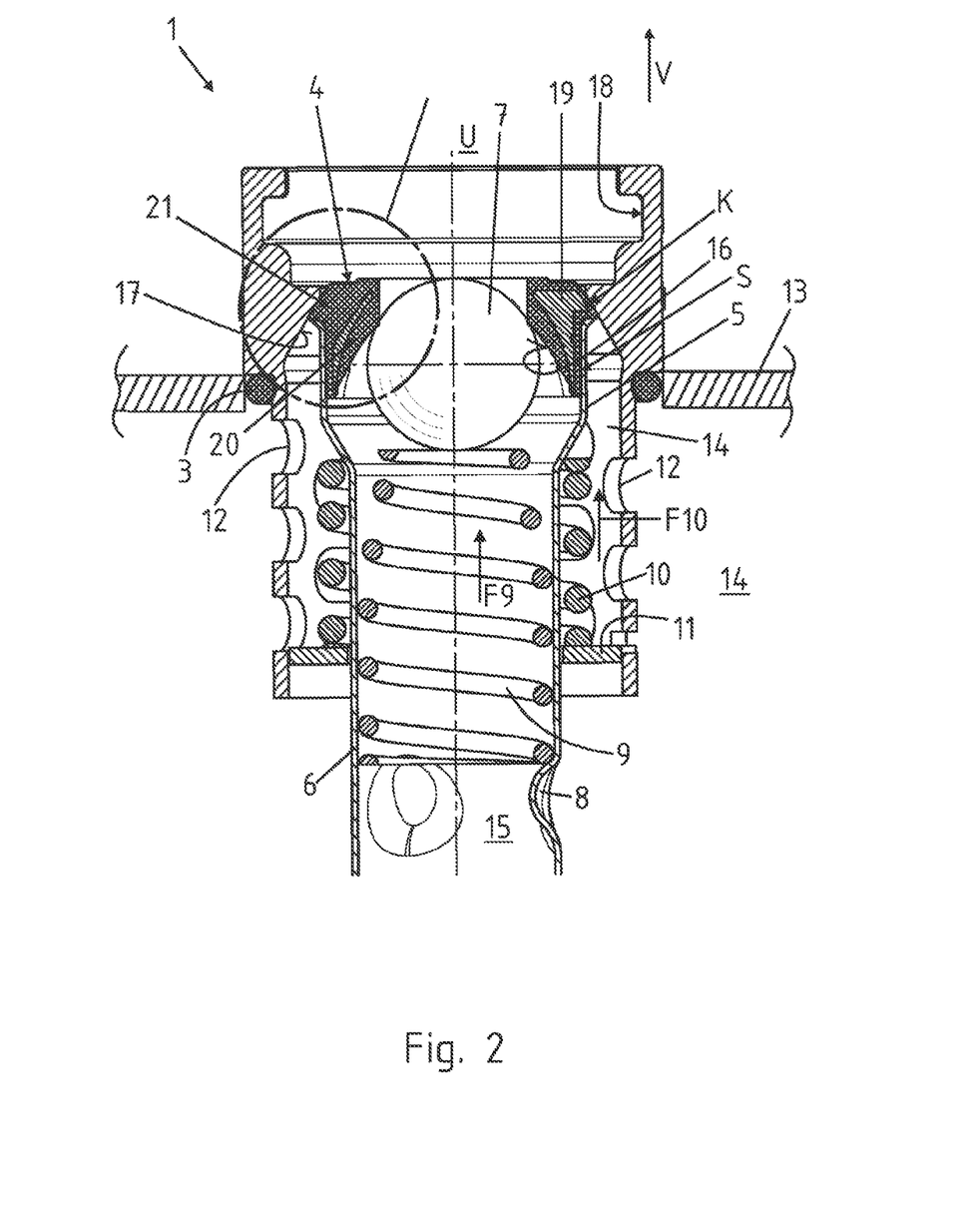
FIG. 2 shows a cross-sectional view of the fitting arrangement of FIG. 1 in an assembled configuration.

FIG. 2 shows a cross-sectional view through an assembled fitting arrangement 1, wherein the fitting arrangement 1 is inserted into a cask 13. For this purpose, a gas side 14 is formed in the cask 13 itself, and a beverage side 15 is formed in the riser pipe 6 itself and also below the fitting arrangement 1 if the cask 13 is oriented upward with respect to the vertical direction V. In particular, the gas side 14 is formed between fitting sleeve 2 and riser pipe 6, which is realized by the apertures 12 in the fitting sleeve 2. In the closed sealing state, the spring force F9 thus presses the ball 7 against an internal sealing surface 16 of the seal 4. A beverage present on the beverage side 15 is thus prevented from escaping to the environment U.

The upper end 5 of the riser pipe 6 is widened, wherein the second helical compression spring 10 comes into form-fit engagement here, and the entire riser pipe 6 presses with the seal 4 against an inner sealing surface 17 of the fitting sleeve 2 counter to a spring force F10. In this way too, the beverage is sealed off from the environment U from the gas side 14 in the closed state.

In the case of activation, a tap head (not shown) would be inserted with form-fit engagement into a tap receiver 18 and would push the riser pipe 6 with seal 4 downward relative to the vertical direction V. In this way, a gas would be transported into the cask 13 via the gas side 14 such that, during the tapping operation, the ball 7 is in turn moved downward with respect to the seal 4 relative to the vertical direction V and, consequently, the beverage can flow out and is removed from the cask 13.

The seal 4 itself is composed of a reinforcement ring 19 and an elastic sealing material 20 surrounding the latter. According to the invention, provision is made that the reinforcement ring 19 has a material recess 21. The seal 4 has a head portion K at the top and a web portion S.

Figure 3:
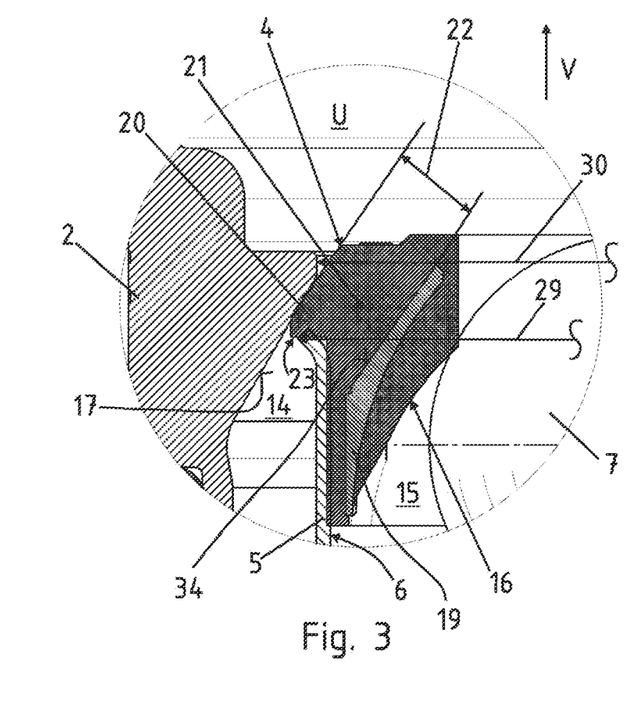
FIG. 3 shows an enlarged portion of the fitting arrangement shown in FIG. 2.

This is better illustrated in the enlarged view in FIG. 3. It can clearly be seen here that the distance 22 between the reinforcement ring 19 and the inner sealing surface 17 of the fitting sleeve 2 is increased by the material recess 21. A beveled surface 34 of the reinforcement ring 19 is thus at a distance 22 from the inner sealing surface 17. In the installation position, the beveled surface 34 can extend parallel to the inner sealing surface 17, at least in the view according to FIG. 3, which shows a cross section of the respective section line III-III from FIGS. 5b, 5d and 5f. In the case of a curved surface 33 of FIG. 5d, the distance 22 between the surface 33 and the inner sealing surface 17 would be approximately constant in the image plane of FIG. 3 and out of the image plane of FIG. 3. In the embodiment variants according to FIGS. 5b and 5f with a flat surface 34, the distance 22 decreases, in relation to FIG. 3, into the image plane and out of the image plane. In this case there is then also a change of the angle at which the surface 34 and the inner surface 17 extend relative to each other. Within the meaning of the invention, however, it is also possible that the surface 34 and the inner sealing surface 17 according to FIG. 3 do not extend parallel to each other, but at an angle to each other.

Figure 4:
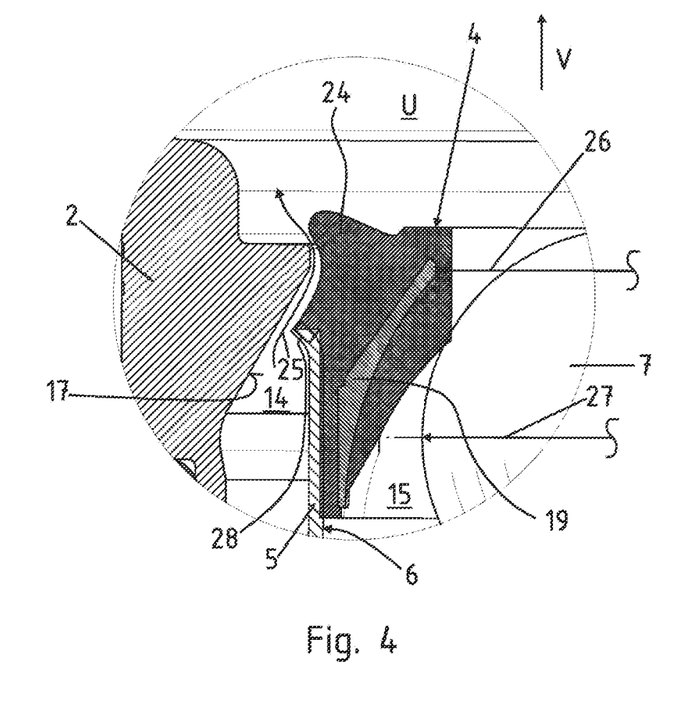
FIG. 4 shows the enlarged portion of the fitting arrangement shown in FIG. 2 in and overpressure event.

By means of the material recess 21, it is possible that, from the direction of the gas side 14, an overpressure is applied to an engagement surface 23 of the elastic sealing material 20. By virtue of the fact that the dimensionally stable reinforcement ring 19 is not present here on account of the material recess 21, it is possible that, in the event of an overpressure, a part 24 of the elastic material 20 is pushed outward such that a fluid path 25 for the escape of the overpressure forms, as is shown in FIG. 4. This fluid path comes from the direction of the gas side 14 and can thus continue to the environment U initially with relaxation of the residual gas located in the fully filled cask 13. In this way, the overpressure can escape to the environment U under expansion of the gas. At the same time, however, the fact that the elastic sealing material 20 is deformed only elastically in the region of the material recess 21 ensures that the seal 4 and also the riser pipe 6 and the ball 7 otherwise remain safely in the fitting sleeve 2. In particular, this avoids a shooting-out of the ball 7 in the vertical direction V and/or of the riser pipe 6 in the vertical direction V.

For this purpose, an internal diameter 26 of the reinforcement ring 19 is in particular designed to be smaller than the diameter 27 of the ball 7. The internal diameter 26 at the upper end of the reinforcement ring 19 is radially circumferential, such that the ball 7 is circumferentially completely covered and partially so in the radial direction, and thus a shooting-out of the ball 7 in the vertical direction V is avoided. Moreover, the widened end, in particular a tulip shape at the end 28 of the riser pipe 6, has an external diameter 29 which is greater than an inner diameter 30 of the inner sealing surface 17 (see FIG. 3). This also avoids a situation in which the seal 4 with the riser pipe 6 is conveyed out of the fitting sleeve 2 in the vertical direction V.

Figure 5A:
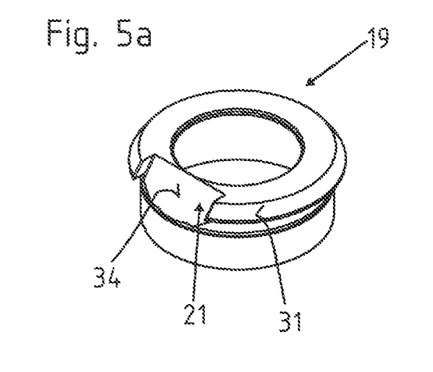
FIGS. 5a to 5f show different perspective and plan views of reinforcement rings in accordance with an exemplary embodiment; and, FIGS. 6a to 6c show sides and plan view of a reinforcement ring with positioning aids in accordance with an alternative embodiment.
Figure 5B:
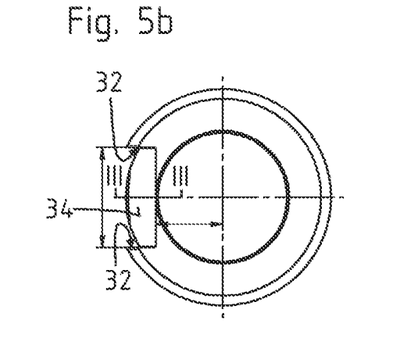
Figure 5C:
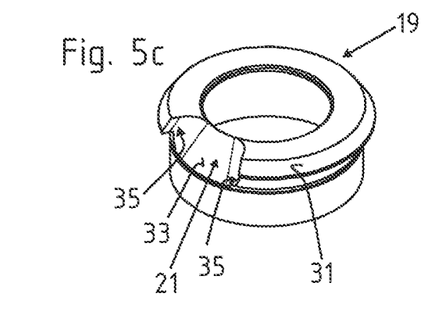
Figure 5D:
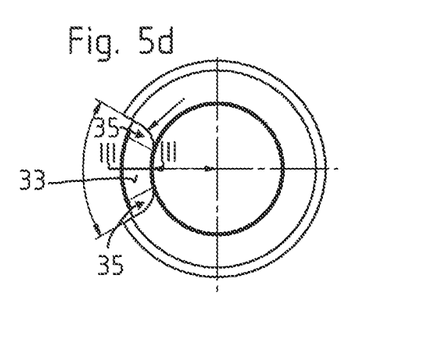
Figure 5E:
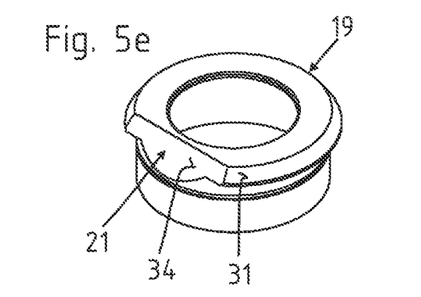
Figure 5F:
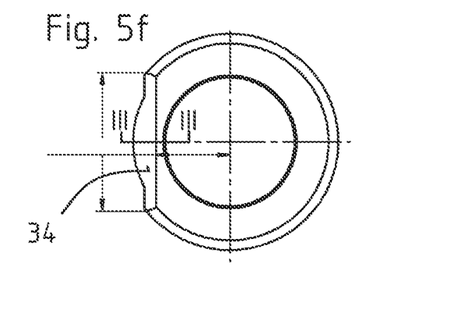

FIGS. 5a to 5f show different perspective views and plan views of the reinforcement ring 19 according to the invention with the respective material recess 21. A preferred embodiment variant is illustrated in FIGS. 5e and 5f, in the form of a beveled flat surface 34. This means that the entire outer jacket surface 31 is beveled with a flat surface 34 or milled flat. Thereafter, this reinforcement ring 19 is completely encapsulated with the elastic sealing material in a mold, by potting or injection molding, such that it is not possible to tell from outside the seal whether the material recess 21 is present. The pressure relief is thus independent of the installation position of the seal 4. Thus, the seal 4 shown in FIG. 3 can be turned in any desired way about its vertical axis through 360°. The pressure relief always triggers when the predefined overpressure is reached in the cask.

According to FIGS. 5a and 5b, an alternative embodiment is shown in which the flat surface 34 is not planed or milled over the entire region thereof and instead is delimited via two sides 32. This therefore results in a recess in the form of a groove milled in the outer jacket surface 31.

Yet another alternative embodiment is shown in FIGS. 5c and 5d, in which the flat surface is not formed as a planar flat surface but as a curved surface 33. The latter is in turn delimited by two sides 35. In the case of the curved surface 33, the sides 35 are likewise provided with a curvature.

Figure 6A:
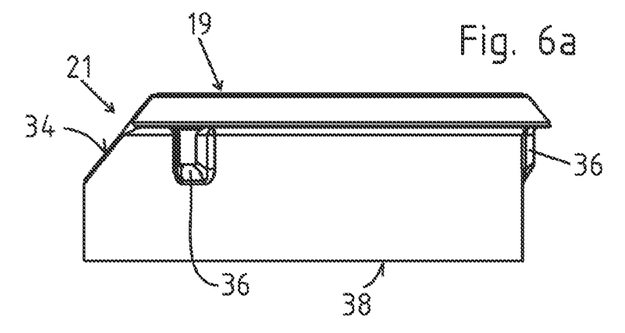
Figure 6B:
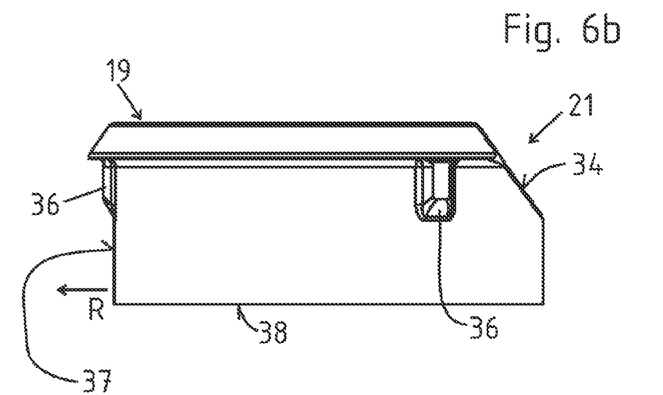
Figure 6C:
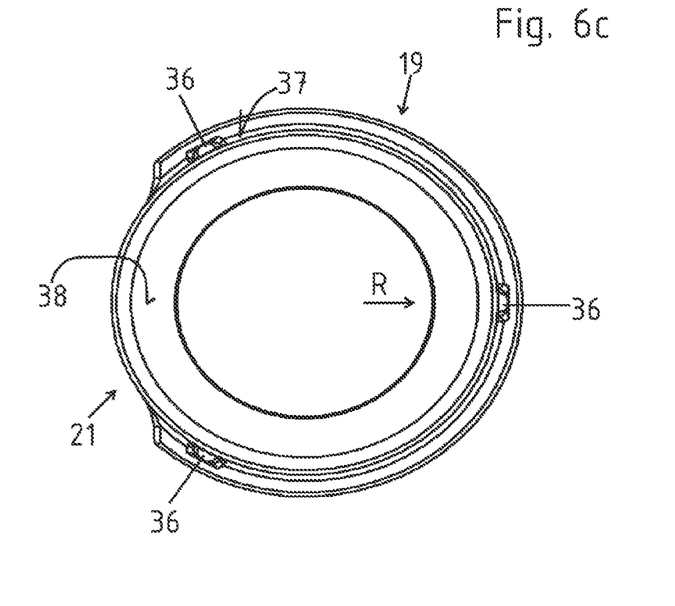

FIGS. 6a to 6c show the reinforcement ring 19 in a preferred embodiment variant with positioning aids 36. The positioning aids 36 are formed as cams protruding in the radial direction R over an outer jacket surface 37. If the reinforcement ring 19 is inserted into a mold in order subsequently to be encapsulated with the elastic sealing material by injection molding or potting, the positioning aids 36 permit an exact positioning in the mold. This would otherwise be made difficult on account of the material recess 21 in the form of the beveled surface 34 shown here, since the reinforcement ring 19 is not rotationally symmetrical circumferentially.

FIG. 6c shows a bottom view of the underside 38. FIGS. 6a and 6b each show a side view.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A fitting arrangement for a cask, comprising:
   a fitting sleeve with a riser pipe arranged therein and resiliently moveable relative thereto,
   wherein the fitting sleeve has a conically extending inner sealing surface tapering toward an upper end,
   a seal incorporated between the inner sealing surface and an upper end of the riser pipe,
   a spring member pressing the riser pipe with the seal against the sealing surface,
   the seal is arranged internally in the upper end of the riser pipe, wherein a sealing body is arranged in the upper end of the riser pipe and is resiliently movable relative thereto,
   the sealing body comes to bear with form-fit engagement on an internal sealing surface of the seal on account of a spring force,
   the seal has an inner reinforcement ring which is surrounded by an elastic sealing material, and the reinforcement ring has a material recess on its outer jacket surface such that the distance from the reinforcement ring to the inner sealing surface of the fitting sleeve is increased,
   wherein the material recess is designed as a beveled surface, or in that the material recess is designed as a groove with an at least partially beveled surface, and in that the beveled surface has a flat profile, or in that the beveled surface has a curved profile, in such a way that, in the event of an overpressure, a part of the elastic sealing material is reversibly deformed elastically outward in the region of the material recess and the part can be returned to its initial position after the overpressure function is triggered.

2. The fitting arrangement of claim 1, wherein the beveled surface extends at least in part parallel to the inner sealing surface.

3. The fitting arrangement of claim 2, further comprising a plurality of apertures provided in a jacket surface of the fitting sleeve, and/or in that the riser pipe is widened in its diameter in the region of an upper end, and wherein the end of the riser pipe flares open in a tulip shape.

4. A cask, comprising:
   a fitting arrangement according to claim 1, wherein the cask is filled at least partially with a beverage, wherein in the event of an overpressure, a part of the elastic sealing material is deformed elastically outward in the region of the material recess such that the overpressure escapes from the cask to the environment.

5. The cask of claim 4, wherein a gas side is formed between riser pipe and fitting sleeve within the cask such that the overpressure escapes from the cask from the gas side.

6. The cask of claim 5, wherein the part can be returned reversibly to its initial position after the overpressure function has been triggered.

7. The fitting arrangement of claim 1, wherein the sealing body is a ball and the reinforcement ring has a radially inwardly tapering internal diameter, and wherein the internal diameter, at least at an upper end, is smaller than the diameter of the ball.

8. The fitting arrangement of claim 7, wherein the seal has an upper head portion in an installation position and a lower web portion, wherein the head portion, tapers upward in its outer jacket surface in the installation position.

9. The fitting arrangement of claim 8, wherein the reinforcement ring is made from a metallic material.

10. The fitting arrangement of claim 8, wherein the reinforcement ring is made from corrosion-resistant steel.

11. The fitting arrangement of claim 8, wherein the reinforcement ring is made from stainless steel.

* * * * *